US009583256B2

(12) United States Patent
Lapetina et al.

(10) Patent No.: US 9,583,256 B2
(45) Date of Patent: Feb. 28, 2017

(54) THREE-DIMENSIONAL WIRELESS CHARGING COIL

(71) Applicant: Verily Life Sciences LLC, Mountain View, CA (US)

(72) Inventors: John Lapetina, Los Altos Hills, CA (US); Russell Norman Mirov, Los Altos, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 220 days.

(21) Appl. No.: 14/303,634

(22) Filed: Jun. 13, 2014

(65) Prior Publication Data

US 2015/0364938 A1 Dec. 17, 2015

(51) Int. Cl.
*H02J 7/00* (2006.01)
*H01F 27/36* (2006.01)
*H01F 38/14* (2006.01)

(52) U.S. Cl.
CPC ............ *H01F 27/365* (2013.01); *H01F 38/14* (2013.01)

(58) Field of Classification Search
USPC ................................. 320/101, 108, 114, 107
See application file for complete search history.

(56) References Cited

U.S. PATENT DOCUMENTS 8,428,746 B2 4/2013 DiGiore et al.
2007/0297294 A1 12/2007 Vuilleumier et al.
2011/0241606 A1* 10/2011 Zhang .................. H02J 7/0042 320/107
2012/0208606 A1 8/2012 Kubo et al.
2012/0269105 A1 10/2012 La Due
2012/0316540 A1 12/2012 Brennan et al.
2013/0053661 A1 2/2013 Alberth et al.
2013/0141037 A1* 6/2013 Jenwatanavet ......... H02J 17/00 320/108
2013/0172691 A1 7/2013 Tran
(Continued)

FOREIGN PATENT DOCUMENTS

JP 2002055176 2/2002
JP 2005278318 A 10/2005
JP 2011109546 A 6/2011

OTHER PUBLICATIONS

International Search Report and Written Opinion of International Application No. PCT/US2015/030262 mailed Aug. 21, 2015.

*Primary Examiner* — Brian Ngo
(74) *Attorney, Agent, or Firm* — McDonnell Boehnen Hulbert & Berghoff LLP

(57) ABSTRACT

Wearable devices are described herein that include a housing, a magnetic shielding, and a coil. The housing includes a first outer surface, a second outer surface opposite the first outer surface, the second outer surface being narrower than the first outer surface and being configured to contact skin at an external body surface, and a chamfer of a given shape between the first outer surface and the second outer surface. The magnetic shielding is disposed in the housing between the first and second outer surfaces. The coil is disposed in the housing and configured to receive energy via a magnetic field. The coil includes coil windings that substantially fit the shape of the chamfer, where the coil windings include a first portion of windings proximate to the magnetic shielding and further include a second portion of windings narrower than the first portion and proximate to the second outer surface.

15 Claims, 11 Drawing Sheets

(56) References Cited

U.S. PATENT DOCUMENTS

| | | | | |
|---|---|---|---|---|
| 2014/0143933 | A1* | 5/2014 | Low | G04C 10/00 2/170 |
| 2014/0232328 | A1* | 8/2014 | Pegg | G04C 10/00 320/108 |
| 2014/0306656 | A1* | 10/2014 | Tabata | H01F 38/14 320/108 |
| 2014/0347799 | A1* | 11/2014 | Ono | H02J 7/025 361/679.09 |
| 2014/0375246 | A1* | 12/2014 | Boysen, III | H02J 5/005 320/101 |
| 2015/0130411 | A1* | 5/2015 | Kim | G04C 10/00 320/108 |

* cited by examiner

THREE-DIMENSIONAL WIRELESS CHARGING COIL

BACKGROUND

Unless otherwise indicated herein, the materials described in this section are not prior art to the claims in this application and are not admitted to be prior art by inclusion in this section.

Wearable devices may be used to obtain information about the wearer's physical activity and/or health state. For example, a wearable device may include one or more motion sensors, such as an accelerometer or gyroscope, in order to detect movements of the wearer and determine the wearer's level of physical activity (e.g., in terms of steps taken or calories burned). Alternatively or additionally, a wearable device may include one or more biological sensors that measure biological parameters of the wearer. The measured biological parameters could include pulse rate, blood oxygenation (oximetry), blood pressure, skin temperature, galvanic skin response (GSR), or other parameters that may relate to the wearer's level of physical exertion.

Generally, wireless charging coils for devices such as mobile phones are planar. For wearable devices, however, it may be desirable for a charging coil and its corresponding housing to have a three-dimensional shape, where windings of the coil may match the shape of the non-planar housing.

SUMMARY

The present disclosure describes embodiments that relate to a three-dimensional (3D) wireless charging coil. In one aspect, the present application describes a wearable device. The wearable device may include a housing, where the housing includes (i) a first outer surface, (ii) a second outer surface opposite the first outer surface, the second outer surface being narrower than the first outer surface and being configured to contact skin at an external body surface, and (iii) a chamfer of a given shape between the first outer surface and the second outer surface. The wearable device may also include magnetic shielding disposed in the housing between the first outer surface and the second outer surface. The wearable device may further include a coil disposed in the housing and configured to generate a magnetic field, where the coil includes coil windings that substantially fit the given shape of the chamfer, and where the coil windings include a first portion of coil windings proximate to the magnetic shielding and further include a second portion of coil windings narrower than the first portion of coil windings and proximate to the second outer surface.

These as well as other aspects, advantages, and alternatives, will become apparent to those of ordinary skill in the art by reading the following detailed description, with reference where appropriate to the accompanying drawings.

DETAILED DESCRIPTION

Figure 1:
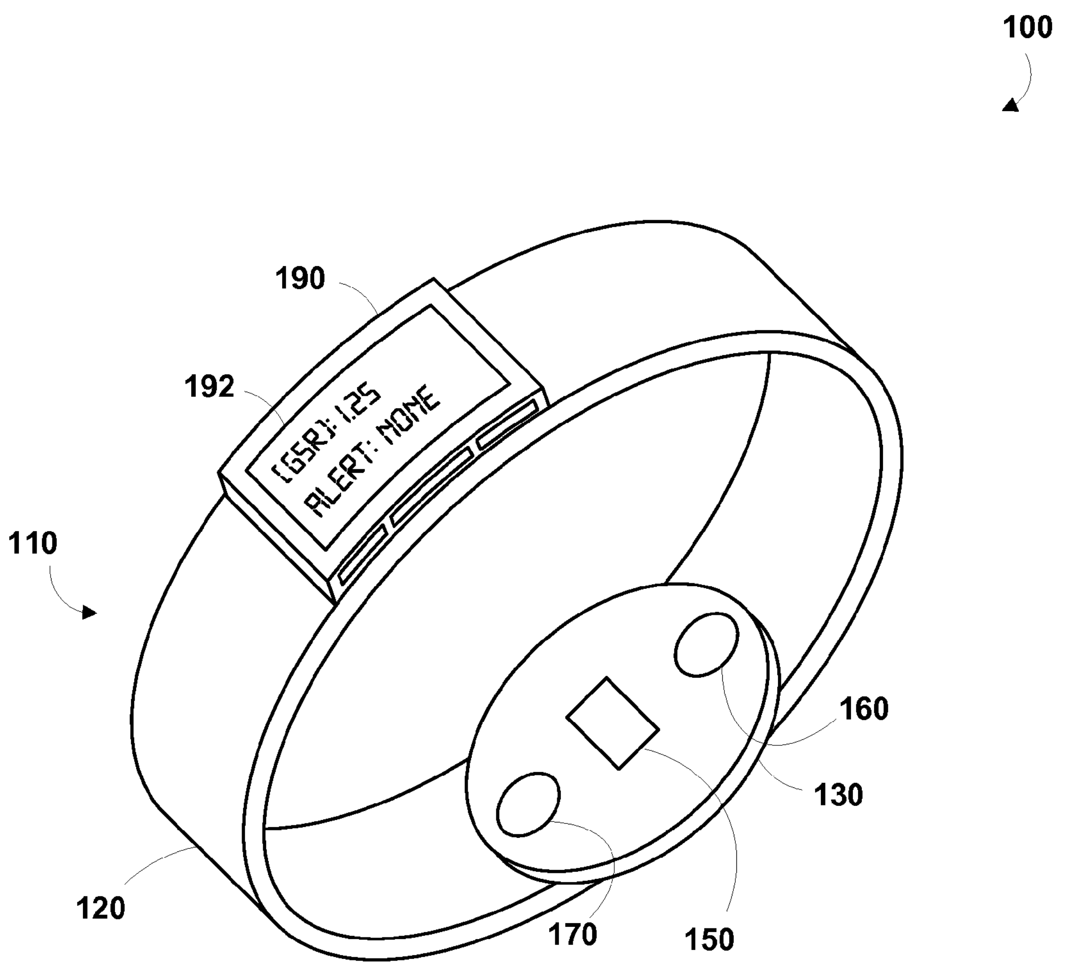
FIG. 1 is a perspective view of an example wearable device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As noted above, it may be desirable for a charging coil and its corresponding housing to have a three-dimensional shape, where windings of the coil may match the shape of the non-planar housing. Such a non-planar embodiment may serve as a more effective charger for the wearable device than a planar embodiment, and may also serve as a means to more efficiently use the space inside the housing for other electronics for the wearable device. Also, this housing (and charging coil) may be more comfortable to wear than a planar embodiment, such as when the housing is included as part of a wearable device configured to be worn around a person's wrist.

Accordingly, in an example embodiment, a wearable device may comprise a housing (e.g., a water-resistant housing) that includes (i) a first outer surface, (ii) a second outer surface opposite the first outer surface, and (iii) a chamfer of a given shape between the first outer surface and the second outer surface. The second outer surface may be configured to contact human skin when the wearable device is mounted (e.g., worn, via a band) on a particular external body surface—such as on a wearer's wrist, for instance. Further, the second outer surface may be narrower than the first outer surface. The housing—including at least one of the first outer surface, the second outer surface, and the chamfer—may be a rigid or semi-rigid enclosure.

The wearable device may still further include a coil disposed in the housing and configured to receive electromagnetic energy via a magnetic field from an external source (e.g., an inductive coupling coil of a wireless charger). The coil may include coil windings that substantially fit the given shape of the chamfer. For example, the coil windings may include a first portion of coil windings proximate to the magnetic shielding, and may also include a second portion of coil windings narrower than the first portion of coil windings and proximate to the second outer surface. In some embodiments, the coil windings may surround an interior portion of the coil, and a central portion of the second outer surface of the housing may be proximate to the interior portion of the coil. The coil may be made from wound wire, or may take the form of traces on an interior flexible printed circuit board (PCB) which are then folded. The coil may take other forms as well.

In other examples of wearable devices, a sensor (or sensors) may be disposed on a central portion of the second outer surface that is configured to detect one or more properties of the body of the wearer when the second outer surface is mounted to and physically touches the external body surface. Such wearable devices could enable a variety of applications, including measuring physiological information about a wearer, indicating such measured physiological information or other information to the wearer (e.g., using a vibrator, a screen, a beeper), or other functions.

The sensor, as well as other possible electronics disposed in the housing, may be powered by a rechargeable battery in the wearable device. The wearable device may further include a recharger for recharging the rechargeable battery. To recharge the rechargeable battery, the recharger may be connected to the coil, and electromagnetic energy received by the coil may be transferred to the recharger. The recharger could be configured to operate the coil to receive electromagnetic energy of a specific frequency (e.g., to have a capacitance related to an inductance or other properties of the coil; to adjust an effective capacitance of the recharger to change the specific frequency and/or to adapt to one or more properties of the environment of the wearable device). The recharger could additionally be configured to operate the coil or other components to communicate with a wireless charger.

The wearable device could include one or more magnetic shielding elements disposed in the housing between the first outer surface and the second outer surface and configured to shield components of the wearable device from electromagnetic energy (e.g., block magnetic flux). That is, certain components of the wearable device could experience heating or other effects when exposed to electromagnetic energy (e.g., a radio-frequency EM field) used for charging. Further, the one or more magnetic shielding elements could be configured to increase the efficiency of energy transfer from a wireless charger to the coil.

In some examples, the one or more shielding elements may include a ferrite sheet (or other sheet of material) disposed between the coil and sensor and other elements of the wearable device (e.g., the rechargeable battery, the recharger, other electronics). In other examples, the ferrite sheet can be disposed directly proximate to the first outer surface of the housing, and other elements of the wearable device may be included in a separate housing. In some examples, the coil and sensor may be disposed on a flexible PCB and connected to elements on the other side of the ferrite (e.g., the rechargeable battery, the recharger, other electronics) by a flexible interconnect that passes through a slot, hole, or other feature of the ferrite. In some examples, the printed circuit on the coil side of the ferrite includes a minimal amount of metal (e.g., conductive circuit traces and/or interconnects) to reduce heating of the wearable device and/or to increase the efficiency of energy transfer to the coil. For instance, the printed circuit on the coil side of the ferrite could lack a ground plane. In other examples, the ferrite or other material of the magnetic shielding may be molded and formed into the shape of the housing, or may be cut and folded into that shape.

FIG. 1 is a perspective view of an example wearable device. A wearable device 100 can be configured to be powered by a rechargeable battery disposed in the wearable device 100. The term "wearable device," as used in this disclosure, refers to any device that is capable of being worn at, on or in proximity to an external body surface, such as a wrist, ankle, waist, chest, or other body part. A mount 110, such as a belt, wristband, ankle band, etc. can be provided to mount the device at, on or in proximity to the external body surface. In some embodiments, a mount could additionally or alternatively include an adhesive. For example, a mount could include and adhesive and could be configured such that it could be used to mount a wearable device to an external body surface of a wearer without wrapping around a part of the wearer (e.g., a limb). The mount 110 may prevent the wearable device 100 from moving relative to the body to ensure consistent contact between the wearable device 100 and the skin. In one example, shown in FIG. 1, the mount 110, may take the form of a strap or band 120 that can be worn around a part of the body.

A housing 130 is disposed on the mount 110 such that the housing 130 can be positioned on an external surface of the body. In this position, a first electrical contact 160 and a second 170 electrical contact protruding from the housing 130 could contact skin at the external surface of the body such that the GSR of the skin (or other parameters that may relate to the wearer's level of physical exertion at the external surface of the body) could be measured between the first and second electrical contacts 160, 170, for instance.

The first and second electrical contacts 160, 170 could be composed of an electrically conductive material, such as a metal or a combination of metals, or a nonmetal conductor. The first electrical contact 160 and second electrical contact 170 could be composed of the same material or different materials. The first and second electrical contacts 160, 170 could each be composed of a single material or could be composed of multiple materials. For example, the electrical contacts 160, 170 could have a bulk composed of one material and a surface plating of another material. For example, the electrical contacts 160, 170, could have a bulk composed of copper and a surface composed of gold or of gold alloyed with nickel and/or cobalt. The surface layer could be deposited by a number of methods familiar to one skilled in the art; for example, electroplating. Other compositions are possible, as well.

The first and second electrical contacts 160, 170 could be spring loaded. That is, the electrical contacts 160, 170 could be configured to include one or more springs or other elements that could be reversibly compressed. The electrical contacts 160, 170 could be spring loaded in a direction perpendicular to an external surface of the body to which the housing 130 could be mounted. That is, the electrical contacts 160, 170 could be spring loaded in order to improve and/or make more consistent an electrical connection between the electrical contacts 160, 170 and skin of the external body surface to which the housing 130 was mounted by the mount 110. Alternatively, first and second electrical contacts 160, 170 could be fixed relative to housing 130.

The geometry of the aspects of the electrical contacts 160, 170 that protrude from the housing 130 could be configured to improve and/or make more consistent an electrical connection between the electrical contacts 160, 170 and skin of the external body surface to which the housing 130 was mounted by the mount 110. For example, the protruding aspects of the electrical contacts 160, 170 could be hemispherical, conical, parabolic, cylindrical, or shaped in some other manner. The electrical contacts 160, 170 could be flat or substantially flat plates (e.g., rectangular, triangular, or other-shaped plates protruding from the housing 130). The electrical contacts 160, 170 could have a faceted geometry. For example, the electrical contacts 160, 170 could be triangular, rectangular, or other-shapes pyramids. The protruding aspects of the electrical contacts 160, 170 could have, for example, a characteristic size (e.g., diameter of cylinders, cones, or hemispheres, width of rectangular prisms or plates, or some other measure of size) between 1 and 5 millimeters. Further, the protruding aspects of the electrical contacts 160, 170 could have an inscribed, cast, and/or pressed texture or pattern. Additionally or alternatively, the exposed aspects of the electrical contacts 160, 170 could be roughened mechanically, chemically, or by some other method. Other geometries, sizes, surface treatments, and other aspects of the configuration of the electrical contacts 160, 170 are anticipated.

The electrical contacts 160, 170 could be arranged a distance apart such that a GSR measured using the electrical contacts 160, 170 could have a desired property or properties. For example, the electrical contacts 160, 170 could be separated by a distance of between 1 and 50 millimeters, such as about 25 millimeters. The electrical contacts 160, 170 could be disposed on the housing 130 such that, if the housing 130 is mounted to a wrist of a wearer of the wearable device 100, the electrical contacts 160, 170 would be arranged on a line substantially parallel to the bones of the forearm of the wearer (i.e., the humerus and ulna). Other distances and directions are also possible.

The housing 130 could be configured to be water-resistant. That is, the housing could be configured to include sealants, adhesives, gaskets, welds, press-fitted seams, and/or other joints such that the housing 130 was resistant to water entering an internal volume or volumes of the housing 130. Further, the interface between the housing 130 and the first and second electrical contacts 160, 170 protruding from the housing 130 could be configured such that the combination of the housing 130 and the electrical contacts 160, 170 is water-resistant.

The electrical contacts 160, 170 protruding from the housing 130 could additionally be used for other purposes than measuring GSR. For example, electronics disposed in the wearable device 100 could be used to sense an electrocardiogram (ECG) signal, a Galvanic skin potential (GSP), an electromyogram (EMG) signal, and/or some other physiological signal present at the electrical contacts 160, 170. Additionally or alternatively, the electrical contacts 160, 170 could be used to detect the presence of a charging device or some other electronic system electrically connected to the electrical contacts 160, 170.

In some examples, the housing 130 further includes at least one detector 150 for detecting at least one other physiological parameter, which could include any parameters that may relate to the health of the person wearing the wearable device. For example, the detector 150 could be configured to measure blood pressure, pulse rate, respiration rate, skin temperature, etc. At least one of the detectors 150 could be configured to non-invasively measure one or more targets in blood circulating in subsurface vasculature proximate to the wearable device. In a non-exhaustive list, detector 150 may include any one of an optical (e.g., CMOS, CCD, photodiode), acoustic (e.g., piezoelectric, piezoceramic), electrochemical (voltage, impedance), thermal, mechanical (e.g., pressure, strain), magnetic, or electromagnetic (e.g., RF, magnetic resonance) sensor.

The wearable device 100 may also include a user interface 190 via which the wearer of the device may receive one or more recommendations or alerts generated from a remote server or other remote computing device, or from a processor within the device. The alerts could be any indication that can be noticed by the person wearing the wearable device. For example, the alert could include a visual component (e.g., textual or graphical information on a display), an auditory component (e.g., an alarm sound), and/or tactile component (e.g., a vibration). Further, the user interface 190 may include a display 192 where a visual indication of the alert or recommendation may be displayed. The display 192 may further be configured to provide an indication the battery status of the device or an indication of any measured physiological parameters, for instance, the GSR being measured by the device.

Figure 2A:
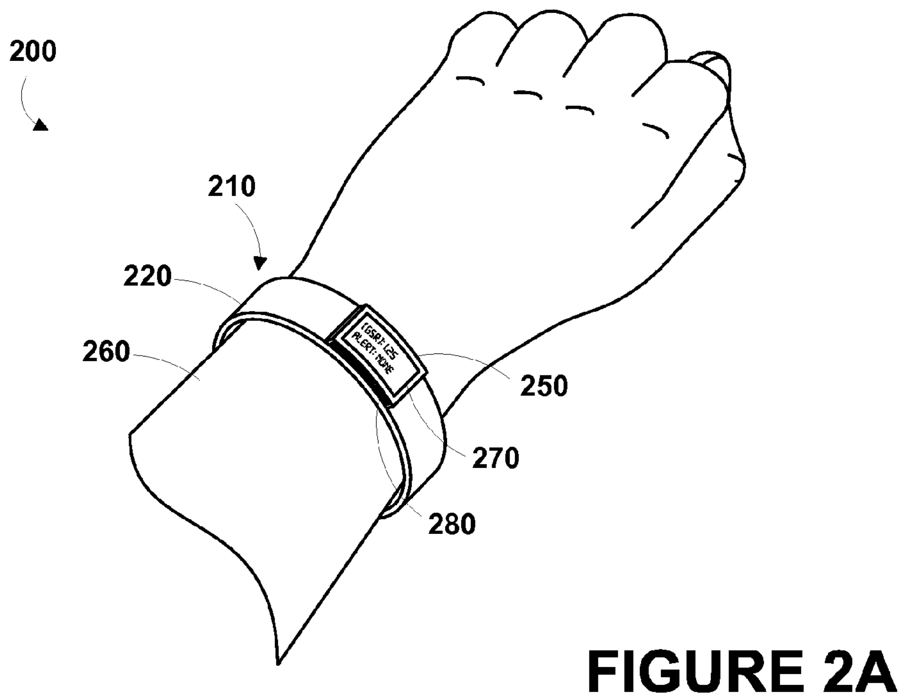
FIG. 2A is a perspective top view of an example wrist-mountable device, when mounted on a wearer's wrist.
Figure 2B:
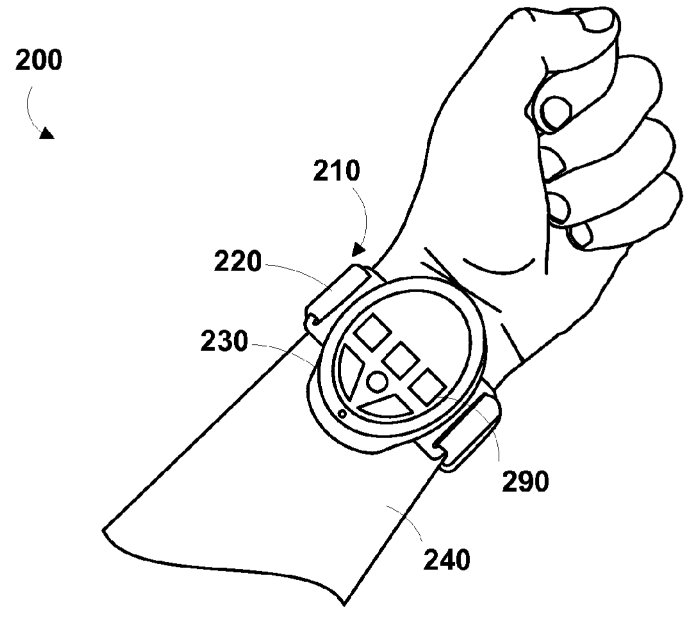
FIG. 2B is a perspective bottom view of the example wrist-mountable device shown in FIG. 2A, when mounted on a wearer's wrist.

In some examples, the wearable device is provided as a wrist-mounted device, as shown in FIGS. 2A, 2B, 3A-3C, 4A, 4B, 5A, 5B, 6A-6D, and 7A-7C. The wrist-mounted device may be mounted to the wrist of a living subject with a wristband or cuff, similar to a watch or bracelet. As shown in FIGS. 2A and 2B, the wrist mounted device 200 may include a mount 210 in the form of a wristband 220, a housing 230 positioned on the anterior side 240 of the wearer's wrist, and a user interface 250 positioned on the posterior side 260 of the wearer's wrist. The wearer of the device may receive, via the user interface 250, one or more recommendations or alerts generated either from a remote server or other remote computing device, or alerts generated by the operation of the wrist mounted device 200. Such a configuration may be perceived as natural for the wearer of the device in that it is common for the posterior side 260 of the wrist to be observed, such as the act of checking a wrist-watch. Accordingly, the wearer may easily view a display 270 on the user interface. Further, the housing 230 may be located on the anterior side 240 of the wearer's wrist. However, other configurations are contemplated.

The display 270 may be configured to display a visual indication of the alert or recommendation and/or an indication of the status of the wearable device or an indication of measured physiological parameters. Further, the user interface 250 may include one or more buttons 280 for accepting inputs from the wearer. For example, the buttons 280 may be configured to change the text or other information visible on the display 270. As shown in FIG. 2B, housing 230 may also include one or more buttons 290 for accepting inputs from the wearer. The buttons 290 may be configured to accept inputs for controlling aspects of the wrist mounted device 200, or inputs indicating the wearer's current health and/or affect state (i.e., normal, anxious, angry, calm, migraine, shortness of breath, heart attack, fever, "flu-like" symptoms, food poisoning, etc.).

Figure 3A:
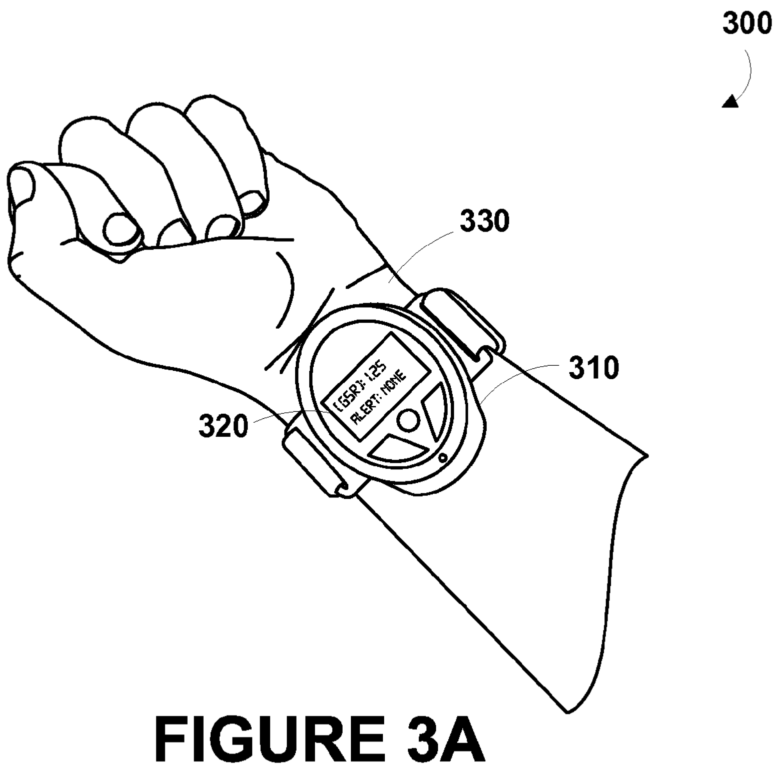
FIG. 3A is a perspective bottom view of an example wrist-mountable device, when mounted on a wearer's wrist.
Figure 3B:
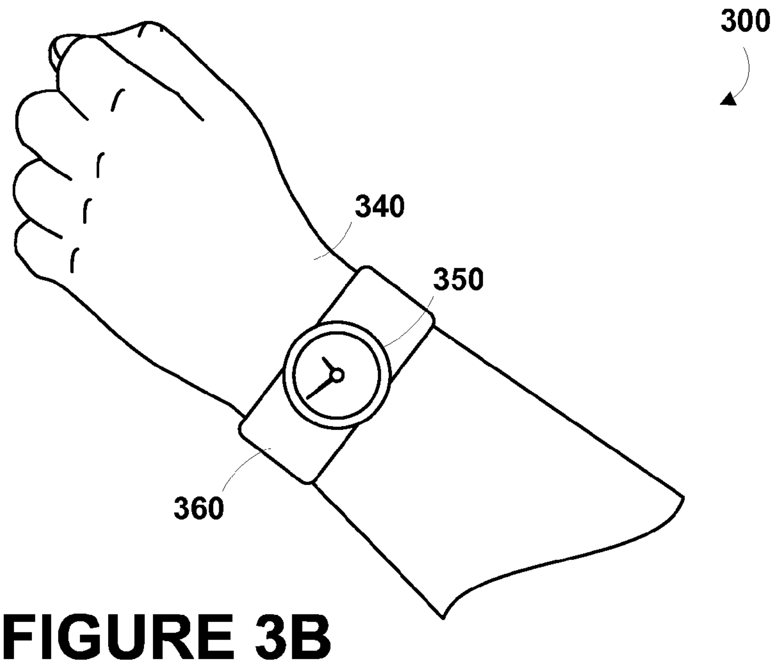
FIG. 3B is a perspective top view of the example wrist-mountable device shown in FIG. 3A, when mounted on a wearer's wrist.
Figure 3C:
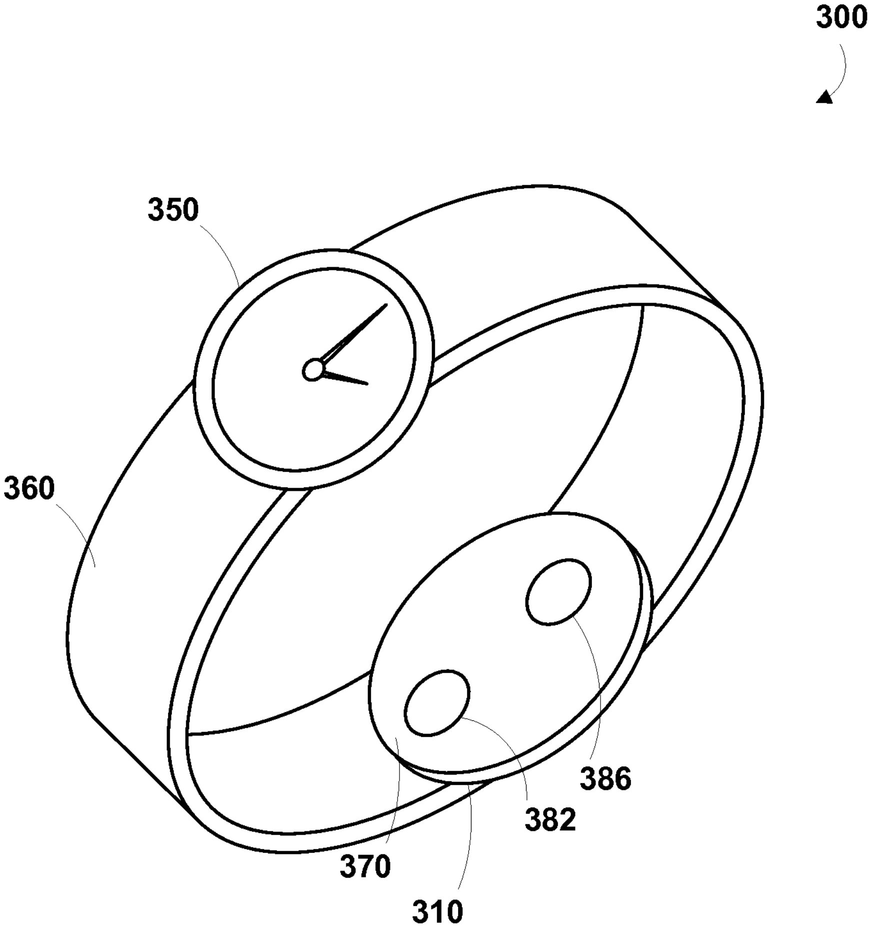
FIG. 3C is a perspective view of the example wrist-mountable device shown in FIGS. 3A and 3B.

In another example wrist-mounted device 300, shown in FIGS. 3A-3C, the housing 310 and user interface 320 are both provided on the same side of the wearer's wrist, in particular, the anterior side 330 of the wrist. On the posterior side 340, a watch face 350 may be disposed on the strap 360.

While an analog watch is depicted in FIG. 3B, one of ordinary skill in the art will recognize that any type of clock may be provided, such as a digital clock.

As can be seen in FIG. 3C, the inner face 370 of the housing 310 is intended to be worn proximate to skin on an external surface of the wearer's body. A first electrical contact 382 and a second electrical contact 386 protrude from the inner face 370 of the housing 310 such that a measurement associated with skin or portions a wearer's body in general proximate to the inner face 370 could be measured using the electrical contacts 382, 386 when the wrist-mounted device 300 was mounted to a wrist of a wearer. The electrical contacts 382, 386 could also be used to charge a battery of the wrist-mounted device 300.

Figure 4A:
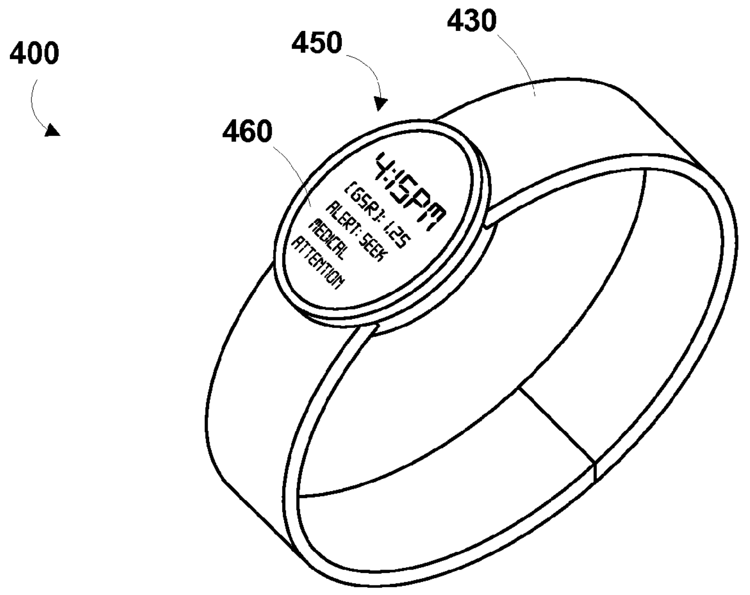
FIG. 4A is a perspective view of an example wrist-mountable device.
Figure 4B:
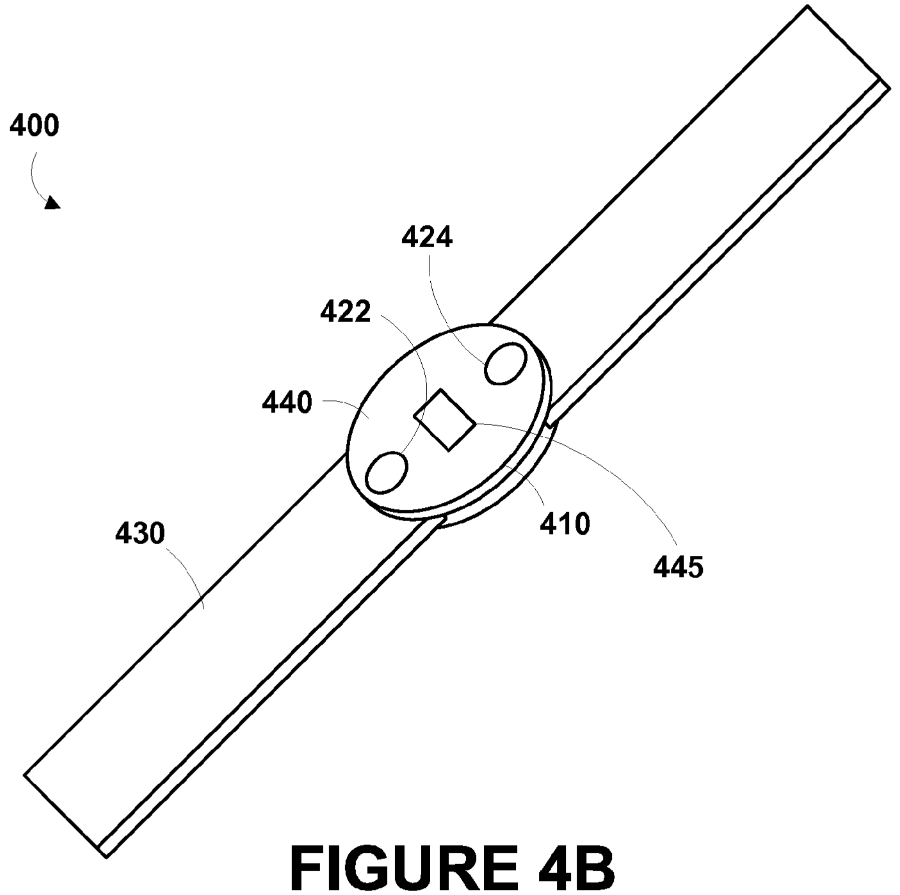
FIG. 4B is a perspective bottom view of the example wrist-mountable device shown in FIG. 4A.

In a further example shown in FIGS. 4A and 4B, a wrist mounted device 400 includes a housing 410, disposed on a strap 430. Inner face 440 of housing 410 may be positioned proximate to a body surface so that a first electrical contact 422 and a second electrical contact 424 protruding from the housing 410 may be used to measure, for instance, the GSR of skin of the body surface proximate to the housing 410. A detector 445 for detecting at least one other physiological parameter of the wearer could also be disposed on the inner face 440 of the housing 410. A user interface 450 with a display 460 may be positioned facing outward from the housing 410. As described above in connection with other embodiments, user interface 450 may be configured to display data about the wrist mounted device 400, including whether the wrist mounted device 400 is active, a GSR of skin proximate to the inner face 440 of the housing 410 measured using the first and second electrical contacts 422, 424, physiological data about the wearer obtained using the detector 445, and one or more alerts generated by a remote server or other remote computing device, or a processor located on the wrist mounted device 400. The user interface 450 may also be configured to display the time of day, date, or other information that may be relevant to the wearer.

Figure 5A:
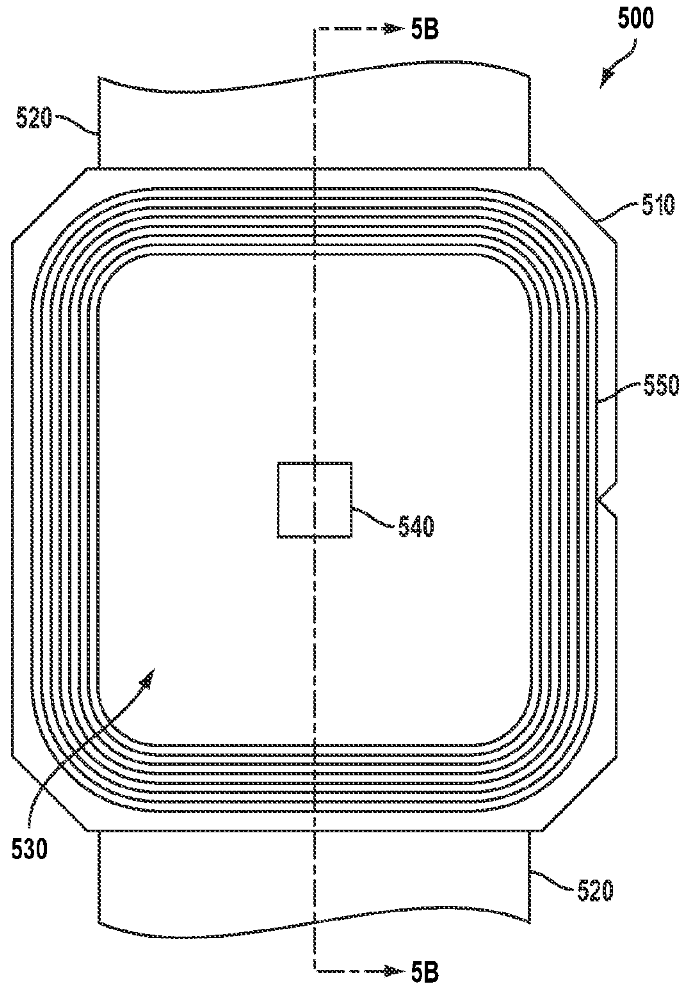
FIG. 5A is a schematic illustration of elements of an example wearable device.

FIG. 5A illustrates a schematic view of components of an example wearable device 500. In line with the Figures described above, the wearable device includes a housing 510 configured to contain electronic components and to be mounted to an external body surface of a wearer by a mount 520. The mount 520 is a band configured to enclose a wrist of a human and to mount a contact surface 530 of the housing 510 in contact with the wrist of the wearer. A sensor 540 is disposed on a central portion of the contact surface and a coil 550 is disposed within the housing 510 proximate to the contact surface 530. The coil 550 comprises windings in three dimensions that outline the central portion of the contact surface 530 such that the central portion of the contact surface 530 is proximate to the interior of the coil 550. In some examples, the housing 510 may include a chamfer (e.g., chamfer 514 of FIG. 5B), and the windings of the coil 550 may substantially fit the shape of the chamfer. For instance, the windings may be angled at substantially the same angle of the chamfer and may be wound around at least a portion of the length of the chamfer. Further, in some examples, the windings of the coil 550 may be wound around a central structure (not shown) that may also be disposed within the housing 510. The central structure may include a chamfer that is substantially the same shape as the chamfer of the housing 510. In some examples, the central structure may be a flexible PCB, or may be made from another type of material.

The wearable device 500 includes additional elements that are not shown, e.g., electronics configured to the operated the coil 550 and/or sensor 540 and to enable applications and/or functions of the wearable device 500, a rechargeable battery configured to power the wearable device 500, a recharger configured to recharge the rechargeable battery using electromagnetic energy received using the coil 550, or other components. Components of the wearable device 500 could be disposed on or within the housing 510, the mount 520, or some other elements of the wearable device 500 (not shown); e.g., a second housing.

Figure 5B:
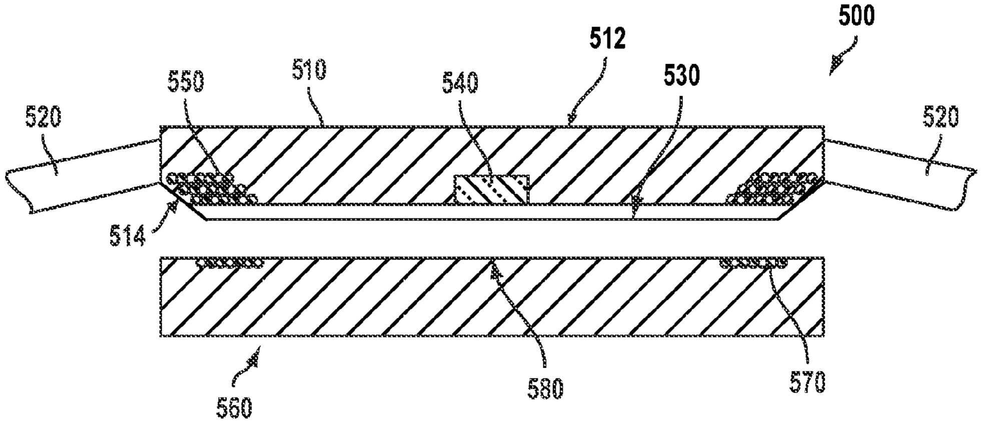
FIG. 5B is a cross-sectional schematic of the example wearable device illustrated in FIG. 5A mounted to an example wireless charger.

FIG. 5B is a cross-sectional view of the wearable device 500 mounted on a wireless charger 560. As shown, the housing 510 includes a first outer surface 512 and a second outer surface (i.e., the contact surface 530) connected by a chamfer 514. As noted with respect to FIG. 5A, the windings of the coil 550 may be angled at substantially the same angle of the chamfer 514 so as to substantially fit the shape of the chamfer 514 and may be wound around at least a portion of the length of the chamfer 514. Accordingly, a portion of the windings proximate to the contact surface 530 may be narrower than another portion of the windings that are closer in proximity to the first outer surface 512 opposite the contact surface 530.

The wireless charger 560 includes a charging coil 570 configured to transfer electromagnetic energy via a magnetic field. The wearable device 500 can be mounted on (e.g., placed on, secured to, disposed in proximity to, aligned with) the wireless charger 560 such that the contact surface 530 of the wearable device 500 is in contact with a charging surface 580 of the wireless charger 560.

In some embodiments, the wearable device 500 and/or wireless charger 560 could be configured to facilitate efficient transfer of electromagnetic energy between the charging coil 570 of the wireless charger 560 and the coil 550 of the wearable device 500 based on a proper alignment, proximity, and/or other specified relative arrangement between the coil 550 and the charging coil 570. For example, the wearable device 500 and/or wireless charger 560 could include elements and/or be configured to facilitate proper alignment between the coil 550 and charging coil 570. In one possible approach, the contact surface 530 and the charging surface 580 could have matching and/or interlocking shapes. In another possible approach, the wearable device 500 and/or wireless charger 560 could include one or more permanent magnets configured to exert aligning magnetic forces between the wearable device 500 and the wireless charger 560. In yet another possible approach, alignment markings may be included to indicate to a user a proper alignment of the wearable device 500 on the wireless charger 560. Other approaches are possible as well.

Further, the wearable device 500 and/or wireless charger 560 could include one or more magnetic shims or other materials having one or more specified magnetic properties to modify the transfer of electromagnetic energy between the coil 550 and the charging coil 570. For example, the wearable device 500 could include a ferrite sheet disposed proximate to the coil 550 on a side of the coil 550 opposite the contact surface 530. The ferrite sheet could be configured to 'focus' electromagnetic energy directed toward the coil 550 such that the coil 550 can receive more of the electromagnetic energy. The ferrite sheet could additionally or alternatively be configured to shield components of the wearable device 500 from electromagnetic energy (e.g., to prevent electromagnetic energy directed toward the wearable device 500 from heating or otherwise affecting components (e.g., electronics, rechargeable batteries) opposite the ferrite sheet from the direction of the electromagnetic energy).

The coil 550 can be configured in a number of ways to enable efficient reception of electromagnetic energy using the coil 550 or to enable and/or facilitate a number of other applications. The windings of the coil 550 could be disposed proximate to a peripheral portion of the contact surface 530 of the housing 510 such that an area enclosed by the coil 550 (e.g., the central portion of the contact surface 530 of the housing 510) is maximized and/or such that a separation distance between the coil 550 and the charging coil 570 is minimized. As noted above, in some examples, the area enclosed by the coil 550 may include a central structure (not shown) (e.g., a flexible PCB) that at least partially resembles the shape of the housing 510, including the chamfer 514. In such examples, the windings of the coil 550 could be disposed around the central structure and the central structure may then be disposed within the housing 510 such that the central structure precisely fits into the housing 510, leaving little air gaps between the windings of the coil 550 and the surface of the chamfer 514 of the housing 510. Accordingly, the windings of the coil 550 could have a shape that is substantially identical to the shape of the chamfer 514

It should be understood that, in some examples, the coil 550 could have a rectangular shape, an elliptical shape, or some other shape according to an application; for example, the shape of the coil 550 could correspond to the shape of the contact surface 530 additionally or alternatively to corresponding to the shape of the chamfer 514. For instance, when non-planar windings of the coil 550 such as those described above are disposed within the housing 510 and substantially fit the shape of the chamfer 514 of the housing 510, the coil 550 may be closer to the platform of the wireless charger 560 and to the charging coil 570, thereby achieving better coupling with the wireless charger 560 than if the coil 550 was more planar.

The coil 550, recharger (not shown), or other components could be configured to enable efficient reception of electromagnetic energy of a specific frequency (e.g., 500 kilohertz to 200 kilohertz) by the coil. For example, the coil and a capacitor of the recharger could be configured to have a resonant frequency equal to the specific frequency of the electromagnetic energy.

The wireless charger 560 could be configured in a variety of ways and include a variety of additional components to facilitate the emission of electromagnetic energy such that the coil 550 of the wearable device 500 can receive the transmitted electromagnetic energy. The wireless charger could include switches, coils, capacitors, variable frequency drives, or other electronics configured to emit electromagnetic energy that could be received by the coil 550 of the wearable device 500. In some examples, the wireless charger 560 could be configured to detect the presence, energy capacity, or other properties of the wearable device 500 and to emit electromagnetic energy having one or more properties related to the detected presence, energy capacity, or other property. In some examples, the wireless charger 560 could receive information from the wearable device 500 indicating an amount of electromagnetic energy to emit toward the coil 550 of the wearable device 500. For example, the wearable device 500 could operate the coil 550 to change the impedance or some other electromagnetically detectable property of the coil 550 in a pattern related to an amount of energy that the wireless charger 560 could emit toward the coil 550 of the wearable device 500 using the charging coil 570. In some examples, the wireless charger 560 and/or wearable device 500 could comply with one or more wireless charging standards (e.g., the Qi wireless charging standard).

Figure 6A:
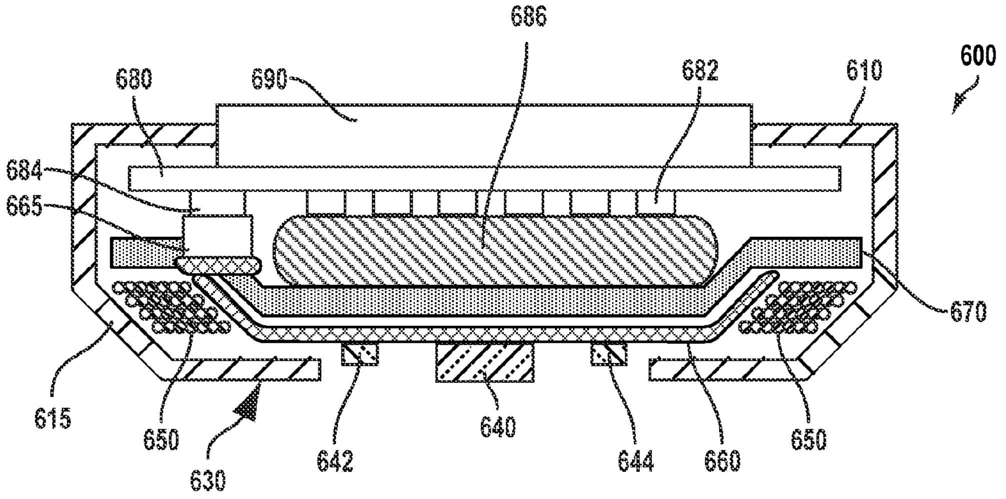
FIG. 6A is a cross-sectional schematic of an example wearable device.
Figure 6B:
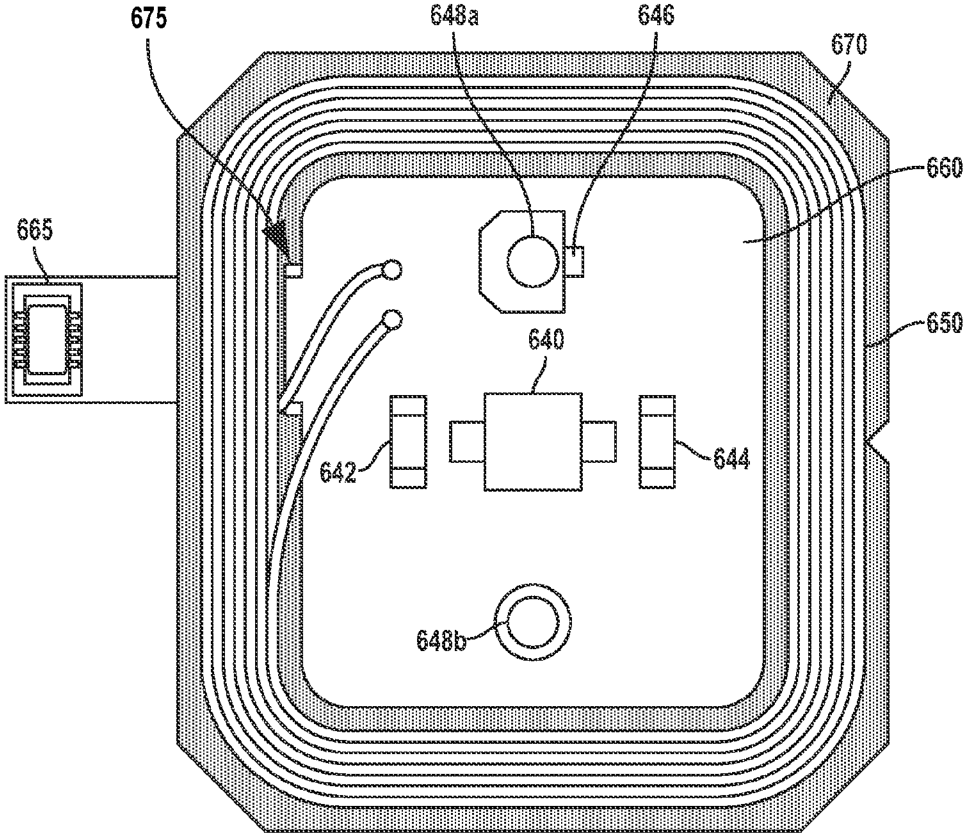
FIG. 6B is an illustration of elements of the example wearable device illustrated in FIG. 6A.
Figure 6C:
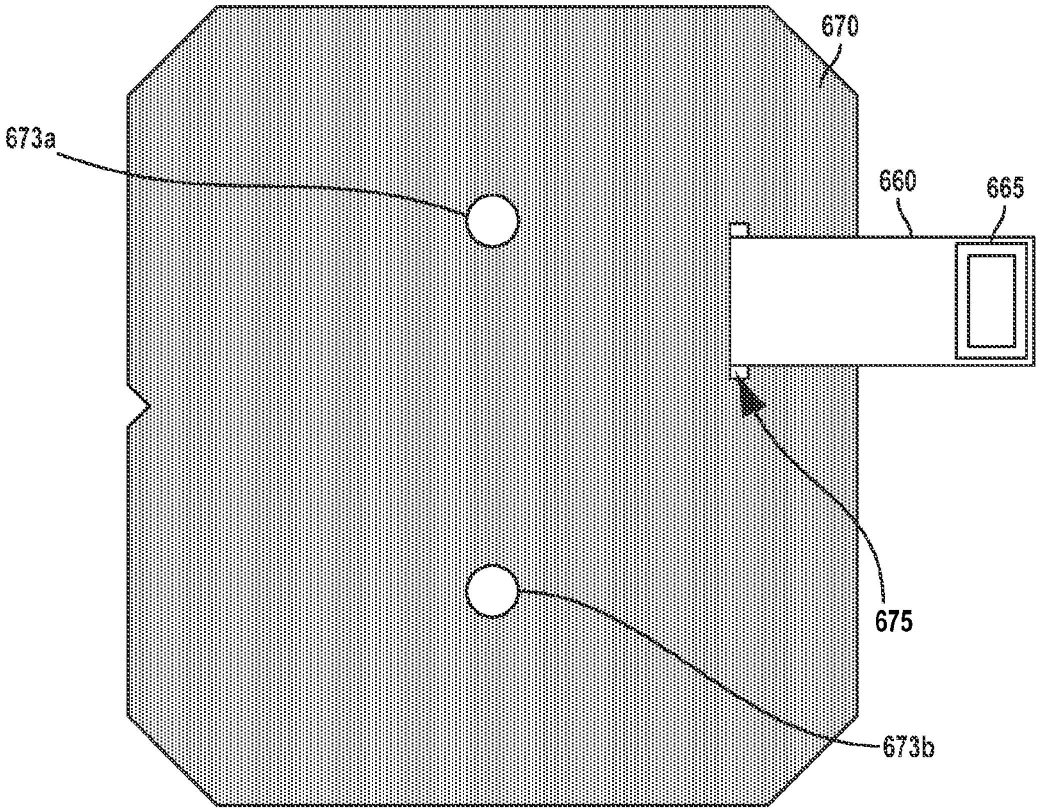
FIG. 6C is an illustration of a reverse view of the elements illustrated in FIG. 6B.
Figure 6D:
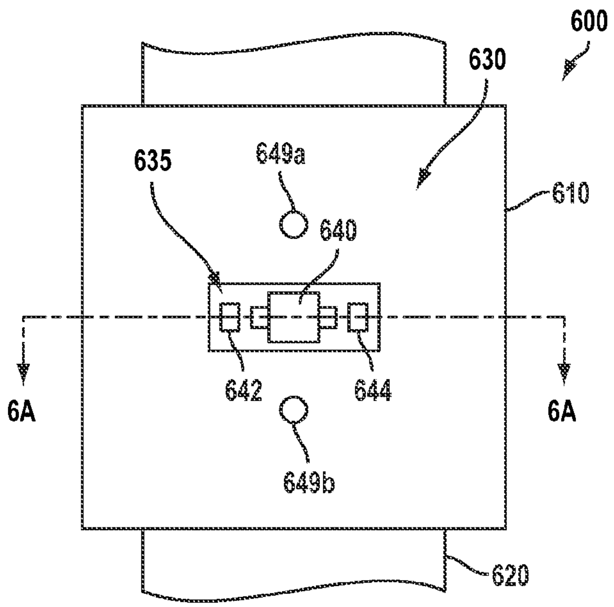
FIG. 6D is an illustration of a surface of the example wearable device illustrated in FIG. 6A.

FIG. 6A illustrates a cross-sectional schematic view of a wearable device 600 that includes a housing 610 and mount (e.g., a band 620, as shown in FIG. 6D) configured to mount a contact surface 630 of the housing to an external body surface (e.g., a wrist) of a wearer. The housing 610 includes a chamfer 615, and the housing 610 contains a coil 650 disposed within the housing 610 proximate to the contact surface 630 that is configured to receive electromagnetic energy. The coil 650 includes windings that substantially fit the shape of the chamfer 615, including narrower windings closer to the contact surface 630, where the windings become wider as the windings are wound further away from the contact surface 630.

The wearable device 600 additionally includes a variety of sensors and components of sensors (e.g., 640, 642, 644) disposed on the contact surface 630 and configured to detect one or more properties of the body of the wearer. FIGS. 6B and 6D illustrate other sensors and components of sensors (646, 648*a*, 648*b*, 649*a*, 649*b*) included in the wearable device 600.

The sensors and components of sensors are mounted on a flexible PCB 660 that is mounted onto a ferrite sheet 670. In some embodiments, the coil 650 may also be disposed on the ferrite sheet 670 and be electronically coupled to the flexible PCB 660. In some embodiments, and as shown in FIG. 6A, one or more of the flexible PCB 660 and the ferrite sheet 670 may have a shape that is identical or similar to the shape of the chamfer 615 (or perhaps identical or similar to the overall shape of the housing 610). As such, one or more of the flexible PCB 660 and the ferrite sheet 670 may be flexible and non-planar, and may be formed (e.g., molded) to substantially fit the shape of at least a portion of the chamfer 615 and/or the overall housing 610. In some examples, the ferrite sheet 670 may comprise multiple portions that are coupled together from a punched-out ferrite sheet. One or more of these portions may be separate from other portions (e.g., the ferrite sheet 670 may take the form of multiple, separate ferrite sheets). It should be understood, however, that in other examples, other types of material used for magnetic shielding may be disposed in the housing 610 instead of a ferrite sheet.

In some embodiments, a flexible interconnect of the flexible PCB 660 passes through a slot 675 in the ferrite sheet 670 and includes a first connector 665 that is connected to a second connector 684 that is disposed on a circuit board 680 on the opposite side of the ferrite sheet 670 from the coil 650 and the sensors and components of sensors (640, 642, 644, 646, 648*a*, 648*b*, 649*a*, 649*b*). Electronics 682 are also disposed on the circuit board 680. An interface 690 and a rechargeable battery 686 are operatively coupled to the circuit board 680 and disposed within the housing 610 on the same side of the ferrite sheet 670 as the circuit board 680 and electronics 682 disposed thereupon.

The electronics 682 could include a variety of different components configured in a variety of ways to enable applications of the wearable device. The electronics 682 could include controllers, amplifiers, switches, display drivers, touch sensors, wireless communications chipsets (e.g., Bluetooth radios or other radio transceivers and associated baseband circuitry to enable wireless communications between the wearable device 600 and some other system(s)), or other components. The electronics 682 include a controller configured to operate one or more sensors and/or components of sensors (e.g., 640, 642, 644, 646, 648*a*, 648*b*, 649*a*, 649*b*) to detect one or more properties of the body of the wearer. The controller could include a processor configured to execute computer-readable instructions (e.g., program instructions stored in data storage of the wearable device 600) to enable applications of the wearable device 600. The electronics 682 additionally include a recharger that is configured to recharge the rechargeable battery 686 and that is configured to be powered by electromagnetic energy received by the coil 650 (i.e., the recharger is configured to recharge the rechargeable battery 686 using energy received by the coil 650). The electronics 682 can include additional or alternative components according to an application of the wearable device 600.

The rechargeable battery 686 may be configured to power the wearable device 600 using stored electrochemical energy and to be recharged a plurality of times. The rechargeable battery 686 could include one or more of a variety of rechargeable battery chemistries, including lead-acid, nickel-metal-hydride, nickel-cadmium, lithium-ion, lithium-polymer, or some other rechargeable battery chemistry. The recharger of the electronics 682 could be configured to recharge the rechargeable battery 686 by applying a constant current, a constant voltage, a trickle current, or some other electrical energy having one or more specified properties to two or more electrodes of the rechargeable battery 686. The rechargeable battery 686 could include one or more thermistors that the controller, the recharger, or some other component of the wearable device 600 could operate to determine a temperature of the rechargeable battery 686 and to prevent damage of the rechargeable battery 686 by reducing a charging rate, a discharging rate, or some other property of use of the rechargeable battery 686 to prevent damage of the rechargeable battery 686.

The interface 690 includes a display configured to present an image to a wearer and to detect one or more finger presses of a wearer on the interface 690. Both the interface 690 and display may be configured to function similarly to the user interface 250 and display 270 described above.

FIGS. 6B and 6C show front and back views, respectively (i.e., a views from the direction of the contact surface 630 and opposite the contact surface 630, respectively) of elements of the wearable device 600. Specifically, FIGS. 6B and 6C illustrate the ferrite sheet 670, flexible PCB 660, and some of the components disposed on the ferrite sheet 670 and/or flexible PCB 660 (e.g., 665, 650, 640, 642, 644, 646, 648*a*, 648*b*). The coil 650 is disposed on the ferrite sheet 670 such that when the coil 650, ferrite sheet 670, and other components are assembled into the housing 610 of the wearable device as shown in FIG. 6A, the coil 650 is proximate to the contact surface 630 of the housing 610 such that windings of the coil 650 outline a central portion of the contact surface 630 proximate to the interior of the coil 650.

Further, the sensors and/or components of sensors (e.g., 640, 642, 644, 646, 648*a*, 648*b*, 649*a*, 649*b*) are disposed on the flexible PCB 660 such that, when assembled into the housing 610 of the wearable device as shown in FIG. 6A, the sensors and/or components of sensors are disposed on the contact surface 130 in the central portion of the contact surface 130. The flexible PCB 670 includes a flexible interconnect that passes through the slot 675 in the ferrite sheet 670. The flexible interconnect is configured to electrically couple the electronics 682 to the coil 650 and the one or more sensors and/or components of sensors (e.g., through the connectors 665, 684, the circuit board 680, and through traces patterned on the flexible interconnect). Note that, in come embodiments, the flexible interconnect could include a cable, discrete wires, a second flexible PCB electrically connected to the flexible PCB 670, or some other element(s) configured to pass through a hole, slot, or other feature of the ferrite sheet 680 and to electrically couple the coil 650 and sensors and/or components of sensors on a first side of the ferrite sheet 670 to one or more electronic components on a second side of the ferrite sheet 670 opposite the first side.

The ferrite sheet 670 is composed of one or more materials having specified magnetic properties such that, when electromagnetic energy is directed toward the wearable device 600 from the direction of the contact surface 630 such that the coil 650 can receive a portion of the directed electromagnetic energy, the electronics 682, rechargeable battery 686, and/or other components on a side of the ferrite sheet 670 opposite the coil 650 are heated less by that directed electromagnetic energy than if the ferrite sheet 670 was not present. That is, the ferrite sheet 670 is configured to act as a shield to protect the electronics 682, rechargeable battery 686, and/or other components on a side of the ferrite sheet 670 opposite the coil 650 from heating, radio-frequency noise, and/or other effects of electromagnetic energy directed at the coil 650 to provide the wearable device 600 with energy (e.g., energy that can be used to recharge the rechargeable battery 686). The ferrite sheet 670 could also be configured to increase an efficiency of energy transfer between an emitter of electromagnetic energy and the coil 650. For example, the ferrite sheet 670 could be configured to increase a coupling between the coil 650 and a charging coil that is directing electromagnetic energy toward the coil 650 (e.g., by concentrating within the ferrite sheet 650 magnetic flux that passes through the windings of the coil 650 such that the more of the magnetic flux acts to transfer energy to the coil 650). For example, the ferrite sheet 670 could be wider than the coil 650 by at least 0.5 millimeters.

The ferrite sheet 670 could include materials having a specified high permeability such that the ferrite sheet 670 could redirect magnetic flux to reduce heating of the electronics 682 and/or rechargeable battery 686 due to electromagnetic energy directed toward the coil 650 and/or to increase the efficiency of energy transfer to the coil 650 from electromagnetic energy directed toward the coil 650 (e.g., by a charging coil of a wireless charger). The ferrite sheet 670 could include materials having a specified low electrical conductivity such that the ferrite sheet 670 is minimally heated by exposure to time-varying electromagnetic fields (i.e., the ferrite sheet 670 could experience minimal eddy currents when exposed to time-varying magnetic fields). The ferrite sheet 670 could include soft magnetic materials, zinc ferrite, alpha iron, iron oxides, nickel, zinc, manganese, or oxides, alloys, or other combinations of these or other materials having specified magnetic properties.

The ferrite sheet 670 additionally includes two mounting holes 673*a*, 673*b* configured to facilitate the assembly of the ferrite sheet 670 and other elements of the wearable device 600. For example, screws, bolts, or other fasteners could pass through the mounting holes 673*a*, 673*b* to attach elements of the wearable device 600 (e.g., the housing 610, the circuit board 680, the interface 690) to other elements of the wearable device 600 (e.g., electrical contacts 629*a*, 649*b* used to detect a GSR of skin of a wearer and/or to enable other applications of the wearable device 600. Other configurations of the ferrite sheet 670 and/or additional or alternative magnetic elements (e.g., ferrite cores configured to focus flux through the windings of the coil 650, ferrite cans, laminated sheets of ferrite material configured to minimize eddy current losses) are anticipated. For example, the ferrite sheet 670 and/or other magnetic materials of the wearable device 600 could be magnetized or have some other magnetic property such that the wearable device 600 experiences an aligning magnetic force when mounted on a wireless charging device.

The flexible PCB 660 and components disposed thereupon could be configured to increase the efficiency of electromagnetic energy reception by the coil 650. For example, very few components could be disposed on the flexible PCB 660. For example, the wearable device may include a blood oxygenation and pulse oximetry sensor that includes a photodiode 640 and two light-emitting diodes (LEDs) 642, 644. Amplifiers, current sources, controllers, ADCs, and other components of the blood oxygenation and pulse oximetry sensor could be disposed on the circuit board 680 on the opposite side of the ferrite sheet 670 from the coil 650 while only elements of the sensor requiring direct access to the body of a wearer (e.g., the photodiode 640 and LEDs 642, 644 and a minimum of metallic tracing patterned on the flexible PCB 660 to electrically couple the photodiode 640 and LEDs 642, 644 to the other components of the sensor) are disposed on the flexible PCB 660. In general, a minimum of conductive material could be disposed on the flexible PCB 660 (e.g., printed circuit traces, electronic components). In some examples, regions of the flexible PCB 670 that do not feature traces could not include conductive material. For example, the flexible PCB 670 could lack ground planes, shield planes, signal or other large 'pours' or other large contiguous regions wholly or partially covered with conductive material.

The windings of the coil 650, when assembled into the wearable device 600, are disposed proximate to a peripheral portion of the contact surface 630 of the housing 610. The coil 650 could be configured in this way to maximize the area enclosed by the coil 650 while remaining disposed within the housing 610. The windings of the coil 650 could be configured differently according to an application. For example, the coil 650 could include figure-eight windings, multiple discrete sets of windings, windings having a rectangular shape, windings having an elliptical shape, or other patterns, shapes, or configurations according to an application. In some examples the coil 650 could be disposed on the flexible PCB 660. For example, one or more windings of the coil 650 could be a trace on the flexible PCB 660. One or more properties of the coil 650 could be specified according to an application. In some examples, the coil 650 could have a substantially rectangular shape and a size of approximately 26 millimeters by 19 millimeters, corresponding to an internal shape and size of the periphery of the housing 610 of the wearable device 600. In other examples, the coil 650 could have a substantially ovular or circular shape. The shape, size, number of windings, and other properties of the coil, 650 (as well as properties of components of a recharger powered by electromagnetic energy received by the coil 650) could be specified such that the coil is able to receive electromagnetic energy having a specified frequency. The specified frequency could be in the range of 100 kilohertz to 200 kilohertz. The specified frequency could be specified by a wireless charging standard or standards (e.g., the Qi wireless charging standard).

It should be understood that when disposed in other types of housings, such as housings associated with headsets, laptops, and the like, the coil 650 may take other sizes and shapes.

Sensors of the wearable device configured to detect one or more properties the body of a wearer of the wearable device 600 could include a variety of components and could function using a variety of different mechanisms. The sensors could include light sensors, sound sensors, vibration sensors, electrical sensors (e.g., current sensors, electric field sensors, voltage sensors), electrical contacts or probes, magnetic sensors, electromagnetic energy sensors, acoustic sensors, accelerometers, pressure sensors, IR sensors, cameras, temperature sensors, or other sensors or combinations of sensors. Further, the sensors could be active sensors or could otherwise include energy emitters, including but not limited to light emitters, LEDs, lasers, electromagnetic energy emitters, emitter antennas, emitter coils, microwave emitters, magnetic field emitters, magnets, IR emitters, UV emitters, vibrators, or other energy emitting elements or combinations of energy emitting elements.

The sensors could be operated to detect one or more of a variety of properties of a wearer of the wearable device 600. For example, light could be emitted (e.g., using the LEDs 642, 644) toward an external body surface of a wearer to illuminate the external body surface, and one or more properties of light received from the external body surface could be detected (e.g., using the photodiode). This illumination and detection could be used to detect an oxygenation state of blood proximate to the wearable device (e.g., in the skin of the external body surface), a heart rate of the wearer, a flow profile of the blood in vasculature of the wearer, or some other information. The sensors could be configured to detect one or more properties of a contrast agent (e.g., a functionalized fluorophore, chromophore, magnetic particle, or some other natural or artificial contrast agent) in the body of the wearer proximate to the wearable device 600 according to an application.

In some examples, contacts could protrude from the wearable device 600 and could facilitate physical measurement of properties of the body of the wearer (e.g., of the skin at the external body surface). FIG. 6D illustrates a view of the contact surface 630 of the wearable device 600, including two circular, rounded contacts 649*a*, 649*b* configured to protrude from the contact surface 630 and to make electrical and/or thermal contact with skin of the external body surface of the wearer. The contacts 649*a*, 649*b* are in electrical contact with electrical pads 648*a*, 648*b*, respectively, on the flexible PCB 660 such that a GSR of the skin at the external body surface can be detected by the wearable device 600 (e.g., by using components of the electronics 682 to apply a specified voltage between the contacts 649*a*, 649*b* and detecting a current through the contacts 649*a*, 649*b* related to the GSR of the skin proximate to the contacts 649*a*, 649*b*). One of the contacts 649*a* is additionally in thermal contact with a thermometer 646 disposed on the flexible PCB 660 such that the temperature of the external body surface of a wearer could be detected by the thermometer 646 using the first contact 649*a*. Other uses and configurations of electrical, thermal, or other physical contacts (e.g., 649*a*, 649*b*) are anticipated.

One or more components of the sensors could be disposed on the contact surface 630 of the housing 610 such that the one or more components could access (e.g., detect a property of, emit energy toward, illuminate, physically contact) an external body surface of a wearer. The one or more components could be disposed proximate to a window, filter, grate, hole, or other feature of the housing 610 to facilitate operate of the sensor. The housing 610 includes a window 635 through which the LEDs 642, 644 can illuminate skin of the external body surface of the wearer. The photodiode 640 is also positioned proximate to the window 635 to enable the photodiode 640 to receive light from the external body surface. The window 635 could be fitted with a wholly or partially transparent window or other filter to enable the housing 610 to be water-resistant. Additionally or alternatively, the housing 610 could be configured to include sealants, adhesives, gaskets, welds, press-fitted seams, and/or other joints such that the housing 610 was resistant to water entering an internal volume or volumes of the housing 610. Further, the interface between the housing 610 and other elements of the wearable device 600 (e.g., elements of a sensor, buttons, user interface elements, electrical contacts) protruding from, embedded in the surface of, or otherwise interrupting the material of the housing 610 could be configured such that the combination of the housing 610 and the other elements of the wearable device 600 is water-resistant.

Note that the embodiments illustrated in FIGS. 6A-D are illustrative examples and not meant to be limiting. Alternative embodiments, including more or fewer components in alternative configurations are anticipated. A wearable device could include multiple housings or other such assemblies each containing some set of components to enable applications of such a wearable device. For example, a wearable device could include a first housing within which are disposed a coil configured to received electromagnetic energy and a sensor configured to detect one or more properties of a wearer and a second housing containing a rechargeable battery and electronics configured to recharge the rechargeable battery using energy received using the coil. Wearable device could be configured to perform a variety of functions and to enable a variety of applications. Wearable devices could be configured to operate in concert with other devices or systems; for example, wearable devices could include a wireless communication interface configured to transmit data indicative of one or more properties of the body of a wearer of the wearable device. Other embodiments, operations, configurations, and applications of a wearable device as described herein are anticipated.

Figure 7A:
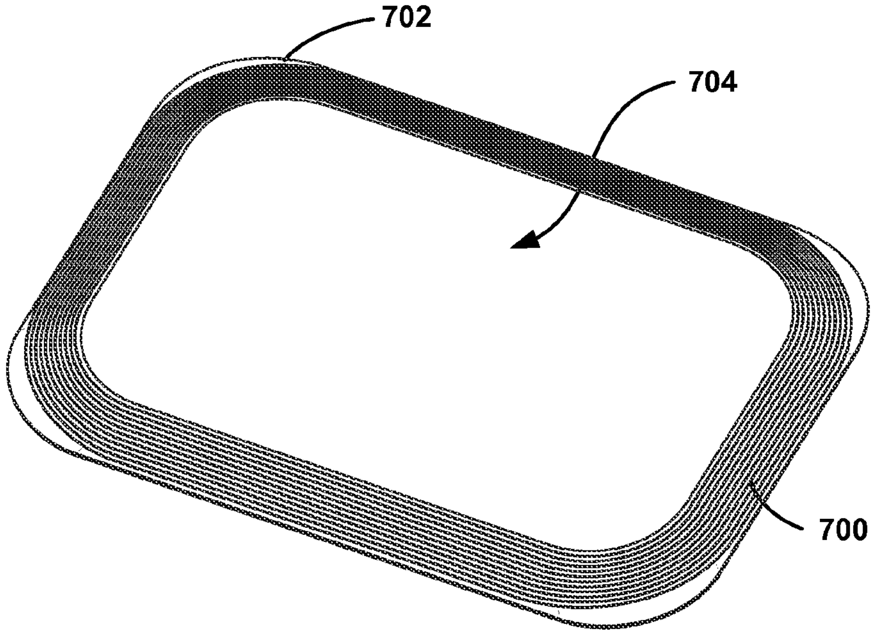
FIGS. 7A and 7B are three-dimensional illustrations of a portion of an example wearable device.
Figure 7B:
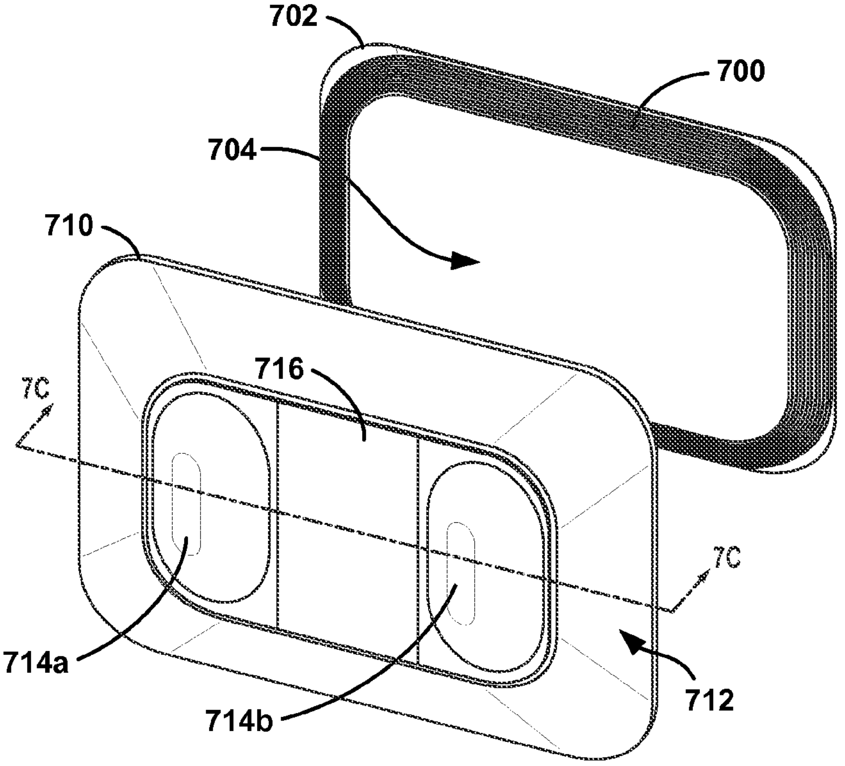

FIGS. 7A and 7B illustrate portions of an example wearable device. As shown, and in line with the discussion above with respect to FIGS. 6A-D, a coil 700 may be disposed onto a structure 702 having an interior surface 704. In some examples, the structure 702 may be a flexible PCB that can be formed into the shape of a housing 710 such that the structure 702 can be fitted into the housing 710. For instance, both the structure 702 and the housing 710 may include a chamfer between each of their respective two outer surfaces, such as a chamfer 712 with a given shape shown in FIGS. 7A-7C. Accordingly, the coil 700 may include windings that outline the structure 702 in the shape of the chamfer 712, with a first portion of windings that are narrower towards the narrow interior surface 704 and a second portion of windings that are wider as they are farther away from the interior surface 704 along at least part of the length of the chamfer of the structure 702.

Within examples such as those just described, when the structure 702 with the coil 700 is disposed in the housing 710, the coil 700 may be close in proximity to the inside of the housing 710 so as to provide better coupling with a wireless charger (not shown) when the contact surface of the housing 710 (the contact surface including rounded contacts 714*a-b* and window surface 716) comes into contact with the wireless charger. The two rounded contacts 714*a*, 714*b* may be configured similarly to the contacts as described above with respect to FIG. 6D and, as shown, may protrude from the contact surface of the housing 710 and may be configured to make electrical and/or thermal contact with skin of the external body surface of the wearer. In some examples, the contacts 714*a*, 714*b* may be in electrical contact with electrical pads (not shown) that are coupled to the structure 702 (e.g., a flexible PCB). Further, the window surface 716 of the housing 710 may be configured like the window 635 in FIG. 6D. The housing 710 and the elements disposed within may vary in other examples.

Figure 7C:
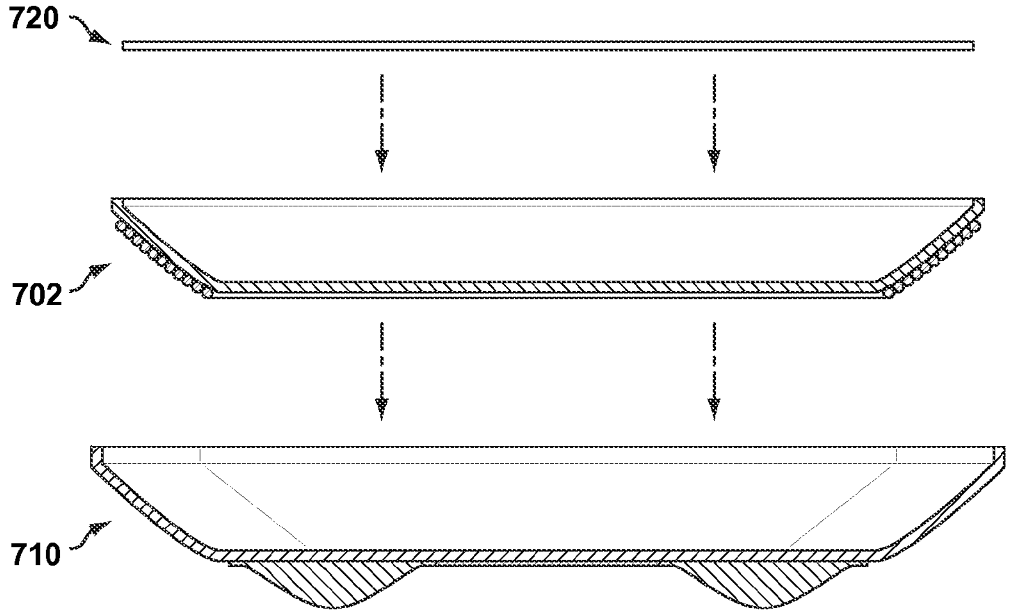
FIG. 7C is an exploded view of an example wearable device.

FIG. 7C is an exploded view of an example wearable device, including elements illustrated in FIGS. 7A and 7B. In example embodiments such as that shown in FIG. 7C, the structure 702 may be disposed into the housing 710. Accordingly, the shape of the structure 702 may be substantially identical to the shape of the housing 710 so that the structure 702 fits into the housing 710 where the coil 700 may be proximate to an inner surface of the housing 710 along the chamfer 712. Further, a magnetic shielding 720 may be disposed in the housing 710 proximate to the wider end of the structure 702 (opposite the narrow end of the structure 702 which is proximate to the surface of the housing 710 with the two rounded contacts 714*a*, 714*b* and the window surface 716). It should be understood that in other example wearable devices, the shape of the device may differ from a chamfer and may take other forms, such as that of a bowl, torus, or other shape.

Figure 8:
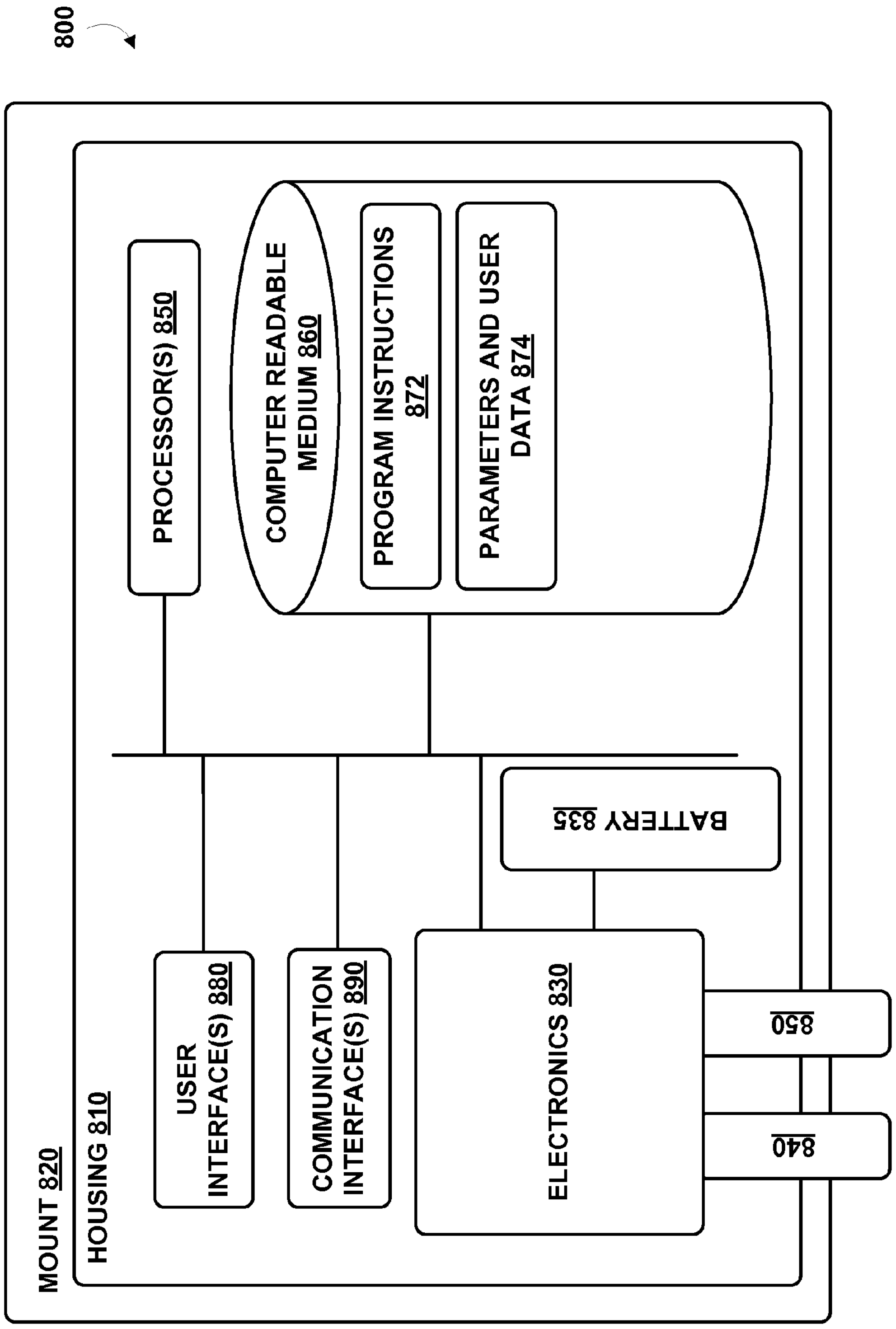
FIG. 8 is a functional block diagram of an example wearable device.

FIG. 8 is a simplified block diagram illustrating the components of a wearable device 800, according to an example embodiment. Wearable device 800 may take the form of or be similar to one of wearable device 100 and/or the wrist-mounted devices 200, 300, 400, 500, 600, shown in FIGS. 1, 2A-B, 3A-3C, 4A-4C, 5 and 6. However, wearable device 800 may also take other forms, for example, an ankle, waist, or chest-mounted device.

In particular, FIG. 8 shows an example of a wearable device 800 having a housing 810, electronics 830 for at least the purpose of recharging a rechargeable battery 835, a user interface 880, communication interface 890 for transmitting data to a server, and processor(s) 850. The components of the wearable device 800 may be disposed on a mount 820 for mounting the device to an external body surface where various parameters of a wearer can be measured. The wearable device 800 also includes a first electrical contact 840 and a second electrical contact 850 protruding from the housing 810 and operatively coupled to the electronics 830. The electronics 830 can use the first and second electrical contacts 840, 850 to interface with a charger or other external device or system to power the electronics and recharge the rechargeable battery 835.

In some embodiments, individual elements of the electronics 800 could be embodied as respective discrete components. Additionally or alternatively, one or more elements of the electronics 800 could be incorporated into one or more integrated circuits. In examples where the electronics 800 are included in a wearable device composed or multiple housings or other subassemblies, the elements of the electronics 800 could all be disposed in a single housing or subassembly or elements of the electronics 800 could be disposed in multiple housings or subassemblies and connected using wires, cables, or other means passing between housings or subassemblies.

Processor 850 may be a general-purpose processor or a special purpose processor (e.g., digital signal processors, application specific integrated circuits, etc.). The one or more processors 850 can be configured to execute computer-readable program instructions 872 that are stored in a computer readable medium 860 and are executable to provide the functionality of a wearable device 800 described herein.

The computer readable medium 860 may include or take the form of one or more non-transitory, computer-readable storage media that can be read or accessed by at least one processor 850. The one or more computer-readable storage media can include volatile and/or non-volatile storage components, such as optical, magnetic, organic or other memory or disc storage, which can be integrated in whole or in part with at least one of the one or more processors 850. In some embodiments, the computer readable medium 860 can be implemented using a single physical device (e.g., one optical, magnetic, organic or other memory or disc storage unit), while in other embodiments, the computer readable medium 860 can be implemented using two or more physical devices.

The electronics 830 could include a recharger (not shown) configured to recharge the rechargeable battery 835 and to be powered through the electrical contacts 840, 850. In some examples, the wearable device 800 could be configured to be mounted on an external charger. The external charger could be configured to apply a voltage and/or current to the electrical contacts 840, 850 sufficient to power the recharger to recharge the rechargeable battery 835. The electronics 830 could include rectifiers or other elements disposed electrically between the recharger and the electrical contacts 840, 850. The rectifiers or other elements could be configured to reduce electrical interference in measurements made using the electrical contacts 840, 850 when the wearable device 800 is mounted to an external surface of a wearer and not mounted to an external charger. Additionally, the recharger could be configured for use without a rectifier.

The recharger could be configured to recharge a rechargeable battery 835 according to the requirements of the rechargeable battery 835. For example, the recharger could be configured to operate in a constant current mode, applying power to recharge the rechargeable battery 835 at a varying voltage but at a specified constant current. Additionally or alternatively, the recharger could be configured to operate in a constant voltage mode, applying power to recharge the rechargeable battery 835 at a varying current but at a specified voltage. The recharger could be configured to operate in more than one mode according to a state of the rechargeable battery 835 and/or a state of a wearable device that includes the electronics 830. For example, the rechargeable battery 835 could be a lithium polymer battery, and the recharger could be configured to begin recharging in a constant-current mode until the voltage of the rechargeable battery 835 reached a voltage threshold. Once the voltage of the rechargeable battery 835 reached the voltage threshold, the recharger could begin charging in a constant-voltage mode until the charge current fell below a current threshold.

The rechargeable battery 835 could be any component capable of powering the electronics 830 and/or a wearable device including the electronics 830 and capable of being recharged by the recharger. The rechargeable battery could have a variety of chemistries, including nickel-metal-hydride, lithium polymer, zinc-polymer, nickel-cadmium, or other rechargeable battery chemistries. The rechargeable battery 835 could include a supercapacitor or other energy storage elements. The rechargeable battery 835 could include a single cell or more than one cell configured in series or in parallel. In examples where the rechargeable battery 835 includes multiple cells, the rechargeable battery 835, recharger, and/or other systems may be configured to recharge, discharge, or otherwise interact with individual cells of the rechargeable battery 835 independently of other cells of the rechargeable battery 835.

Note that, while the electronics 830, processor(s) 850, rechargeable battery 835, and other components are described herein as being disposed in a single housing 810, other configurations are anticipated. In some examples, a wearable device could include multiple housings (e.g., the wearable devices 100, 200, 300 illustrated in FIGS. 1, 2A-B, 3A-C, 4A-B, 5A-B, 6A-D, and 7A-B) and the components of the wearable device could be distributed amongst the multiple housings. For example, a first housing could contain some of the electronics 830 and the electrical contacts 840, 580 could protrude from the first housing. A second housing could include the recharger electronics and the rechargeable battery 835 and elements disposed in the second housing could be electrically connected to elements disposed in the first housing. Other numbers of housings, configurations of housings, and dispositions of components within multiple housings are anticipated.

The program instructions 872 stored on the computer readable medium 860 may include instructions to perform or facilitate some or all of the device functionality described herein. For instance, program instructions 872 could include instructions to operate the electronics 830 to make a GSR measurement using the electrical contacts 840, 850. The program instructions 872 could include instructions to operate based on parameter and user data 874 stored in the computer readable medium 860 and/or modify the parameters and user data 874. For example, the parameters and user data 874 could include calibration data for the wearable device 800 and/or stored GSR measurements made using the wearable device 800.

The program instructions 872 stored on the computer readable medium 860 could include instructions for operating the electronics 830. For instance, the program instructions 872 stored on the computer readable medium 860 could include instructions for operating the electronics 830 to recharge the rechargeable battery 835 and/or to power the wearable device 800 using the rechargeable battery 835. For example, the instructions could include instructions for operating switches or other electrical components to gate power from the electrical contacts 840, 850 to the recharger and/or from the recharger to the rechargeable battery 835. Additionally or alternatively, the instructions could include instructions to operate a voltage or current sensor to detect the presence of an external charger in electrical contact with the electrical contacts 840, 850 and/or to detect a charge state of the rechargeable battery 835. The recharger and/or rectifier elements of the electronics 830 could be passive, that is, they could be configured to recharge the rechargeable battery 835 and/or power the wearable device 800 without direct operation by the processor(s) 850 or other elements of the wearable device 800 (other than the electrical contacts 840, 850) when the wearable device 800 is mounted to an external charger or other appropriately configured power source.

The program instructions 872 can include instructions for operating the user interface(s) 880. For example, the program instructions 872 could include instructions for displaying data about the wearable device 800, for displaying a measured and/or determined GSR or other information generated by the wearable device 800, or for displaying one or more alerts generated by the wearable device 800 and/or received from an external system. Further, program instructions 872 may include instructions to execute certain functions based on inputs accepted by the user interface(s) 880, such as inputs accepted by one or more buttons disposed on the user interface(s) 880.

Communication interface 890 may also be operated by instructions within the program instructions 872, such as instructions for sending and/or receiving information via an antenna, which may be disposed on or in the wearable device 800. The communication interface 890 can optionally include one or more oscillators, mixers, frequency injectors, etc. to modulate and/or demodulate information on a carrier frequency to be transmitted and/or received by the antenna. In some examples, the wearable device 800 is configured to indicate an output from the processor by modulating an impedance of the antenna in a manner that is perceivable by a remote server or other remote computing device.

In some examples, the communication interface(s) 890 could be operably coupled to the electrical contacts 840, 850 and could be configured to communicate with an external system by using the electrical contacts 840, 850. In some examples, this includes sending and/or receiving voltage and/or current signals transmitted through the electrical contacts 840, 580 when the wearable device 800 is mounted onto an external system such that the electrical contacts 840, 850 are in electrical contact with components of the external system.

Individual elements of the electronics 830 could be embodied as respective discrete components. Additionally or alternatively, one or more elements of the electronics 830 could be incorporated into one or more integrated circuits. In examples where the electronics 830 are included in a wearable device composed or multiple housings or other subassemblies, the elements of the electronics 830 could all be disposed in a single housing or subassembly or elements of the electronics 830 could be disposed in multiple housings or subassemblies and connected using wires, cables, or other means passing between housings or subassemblies.

Additionally or alternatively, the voltage sensor could be used to detect when an external charger or other power source was connected to the first and second electrical contacts 840, 850 and/or a charge state of the rechargeable battery 835. Other uses of the voltage sensor are anticipated.

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A wearable device, comprising:

a housing, wherein the housing includes (i) a first outer surface, (ii) a second outer surface opposite the first outer surface, the second outer surface being narrower than the first outer surface and being configured to contact skin at an external body surface, and (iii) a chamfer of a given shape between the first outer surface and the second outer surface;

magnetic shielding disposed in the housing between the first outer surface and the second outer surface; and a coil disposed in the housing and configured to generate a magnetic field, wherein the coil includes coil windings that substantially fit the given shape of the chamfer, and wherein the coil windings include a first portion of coil windings proximate to the magnetic shielding and further include a second portion of coil windings narrower than the first portion of coil windings and proximate to the second outer surface.

2. The wearable device of claim 1, wherein the external body surface is a wrist location.

3. The wearable device of claim 1, wherein the coil windings surround an interior portion of the coil, and wherein the second outer surface of the housing includes a central portion proximate to the interior portion of the coil.

4. The wearable device of claim 1, wherein the coil is mounted on a flexible printed circuit board (PCB).

5. The wearable device of claim 4, wherein the coil comprises at least one trace on the flexible PCB.

6. The wearable device of claim 4, wherein the regions of the flexible PCB that do not feature traces do not comprise conductive material.

7. The wearable device of claim 1, wherein the magnetic shielding is a ferrite sheet configured to block magnetic flux emanating from the coil.

8. The wearable device of claim 7, wherein the ferrite sheet is a molded ferrite sheet that substantially fits a portion of the given shape of the chamfer proximate to the first outer surface of the housing.

9. The wearable device of claim 1, wherein the magnetic shielding comprises multiple portions coupled together from a punched-out sheet of magnetic material.

10. The wearable device of claim 1, wherein the housing is configured to be water-resistant.

11. The wearable device of claim 1, wherein the magnetic shielding is non-planar.

12. The wearable device of claim 1, further comprising:

a rechargeable battery disposed within the wearable device; and a recharger configured to recharge the rechargeable battery, wherein the recharger is configured to be powered by electromagnetic energy received by the coil.

13. The wearable device of claim 1, further comprising first and second electrical contacts protruding from the housing, wherein the first and second electrical contacts are configured to contact skin at the external body surface.

14. The wearable device of claim 1, wherein the coil has a substantially rectangular shape, wherein the coil has a size approximately 26 millimeters by approximately 19 millimeters.

15. The wearable device of claim 1, wherein the coil is configured to receive electromagnetic energy having a specified frequency, wherein the specified frequency is between 100 kilohertz and 200 kilohertz.

* * * * *